United States Patent
Famolari (10) Patent No.: US 7,369,576 B2
(45) Date of Patent: May 6, 2008

(54) MANAGING SCANNING AND TRAFFIC IN A NETWORK

(75) Inventor: David Famolari, Montclair, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 909 days.

(21) Appl. No.: 10/066,781

(22) Filed: Feb. 6, 2002

(65) Prior Publication Data

US 2003/0147424 A1    Aug. 7, 2003

(51) Int. Cl.
 *H04J 3/06* (2006.01)
(52) U.S. Cl. .................. 370/503; 455/574; 370/350
(58) Field of Classification Search .......... 370/324, 370/350, 503–520
See application file for complete search history.

(56) References Cited

U.S. PATENT DOCUMENTS

| 5,561,701 | A | * | 10/1996 | Ichikawa | 340/7.26 |
| 5,689,507 | A | * | 11/1997 | Bloks et al. | 370/389 |
| 6,477,183 | B1 | * | 11/2002 | Yamamoto | 370/508 |
| 6,590,928 | B1 | * | 7/2003 | Haartsen | 375/134 |
| 6,718,395 | B1 | * | 4/2004 | Ziegler | 709/248 |
| 6,968,219 | B2 | * | 11/2005 | Pattabiraman et al. | 455/574 |
| 7,031,294 | B2 | * | 4/2006 | Aiello et al. | 370/348 |
| 2002/0064245 | A1 | * | 5/2002 | McCorkle | 375/346 |
| 2003/0110484 | A1 | * | 6/2003 | Famolari | 717/173 |

* cited by examiner

*Primary Examiner*—Chi Pham
*Assistant Examiner*—Phuc Tran
(74) *Attorney, Agent, or Firm*—Banner & Witcoff, Ltd (57) ABSTRACT

The present invention provides a network communication device and method for simultaneous connection establishment and traffic delivery in a network. The network communication device comprises a first interface for exchanging information with a network device, a second interface connected to the first interface for establishing a connection with the network device, and middleware logic for coordinating information exchange between the first interface and the second interface. The second interface comprises a clock and a clock value that may be dynamically altered. The network communication device may be a Bluetooth device or a Bluetooth Access Point and is capable of functioning in a scan state and a connect state simultaneously.

26 Claims, 7 Drawing Sheets

MANAGING SCANNING AND TRAFFIC IN A NETWORK

FIELD OF THE INVENTION

The present invention relates to management of scanning and traffic in a wireless network environment and more particularly to a network radio device for establishing simultaneous connections and traffic delivery.

BACKGROUND

Presently, portable transceivers of many types including cellular telephones, PCs, laptops, cordless phones, headsets, printers, PDAs, etc., are incorporated into wireless networks. These portable transceivers, such as Bluetooth devices, may contain digital devices to secure fast wireless transmissions of voice or data with worldwide compatibility. As a specification for a small-form factor, low-cost radio solution Bluetooth products may provide links between mobile computers, mobile phones and other portable handheld devices, and connectivity to the Internet. "Bluetooth" refers to a specification to standardize wireless transmission between a wide variety of devices such as PCs, cordless telephones, headsets, printers, PDAs, etc. as is known in the art. Bluetooth creates a single digital wireless protocol to address end-user problems arising from the proliferation of various mobile devices that need to keep data synchronized from one device to another thereby allowing equipment from different vendors to work seamlessly together using Bluetooth as a "virtual cable".

Bluetooth devices may be named according to a common naming concept. For example, a Bluetooth device may possess a Bluetooth Device Name (BDN) or a name associated with a unique Bluetooth Device Address (BDA). Bluetooth devices may participate in an Internet Protocol (IP) network as well. If a Bluetooth device functions on an IP network, it may be provided with an IP address and an IP (network) name. Thus, a Bluetooth Device configured to participate on an IP network may contain at least one of a BDN, a BDA, an IP address and an IP name.

In the case of Bluetooth devices, communication between devices is commonly accomplished through an Inquiry and Paging procedure that entails a first Bluetooth device emitting an INQUIRY message that is received by all Bluetooth devices within range of the first Bluetooth device. In response to receiving the INQUIRY message, Bluetooth devices may return an INQUIRY_RESPONSE message back to the first Bluetooth device. Upon receiving all of the INQUIRY_RESPONSE messages from neighboring Bluetooth Devices available for communication, the first Bluetooth device selects the device in which connection is desired and sends that device a PAGE message. The connection is typically established upon receipt of a PAGE_RESPONSE message from the receiving Bluetooth device.

In this method, however, the Bluetooth devices must be in the proper mode or scan state for receiving INQUIRY or PAGE messages. These scan states may be referred to as Inquiry_Scan state for receiving inquiry responses and Page_Scan state for receiving pages. Collectively, these states may be referred to as scan states. To receive an INQUIRY message, for example, a Bluetooth device must be in the proper Inquiry_Scan state by tuning to a particular frequency hopping pattern (FHP). Likewise, to receive a PAGE message, a Bluetooth device must be in the proper Page_Scan state. However, when a Bluetooth device is in a Scan state, it cannot form a connection with another device. To form a connection with another device, the Bluetooth device must be in a connected state by tuning to a different FHP, namely the channel hopping pattern (CHP). A Bluetooth Device may only tune to one FHP at a time and therefore may not be in a scan state and a connected state simultaneously as each requires a different FHP.

A Bluetooth device must therefore choose between being in a scan state and being in a connected state. A Bluetooth device may enter a scan state in order to become aware of its surrounding devices. Although when the device enters a scan state, it may not maintain an active connection with other devices. This is because a Bluetooth device may form a connection with another device while in a connected state by tuning to a CHP. The length of time that a device spends in a scan state is referred to as the Scan Dwell Time (SDT). The longer this time is, the more the Bluetooth device loses an opportunity for transmitting user information, degrading the throughput performance of the system. Conversely, the longer the time the Bluetooth device spends in a connected state (referred to as connection dwell time, CDT), the longer the device is able to exchange user information, however during this time the device remains oblivious to surrounding devices that are not already connected, degrading the responsiveness of the device to establishing new connections. This may result in lost opportunities to connect with the Bluetooth device. The frequency in which a device enters a scan state is defined by the scan frequency (SF). A low SF indicates that the originating device does not enter a scan state often and as a result, a second device desiring a connection with the originating device may have to wait before the next time the originating device enters scan state to exchange INQUIRY and PAGE messages. The higher the SF, the longer the wait time.

Therefore, a tradeoff exists such that increasing the CDT while necessarily decreasing the SDT would result in longer connection times, more user data being transmitted and more efficient utilization of the link, however, it would also result in decreased opportunity to connect with other devices. On the other hand, increasing SDT while necessarily decreasing CDT would result in the Bluetooth device spending large amounts of time seeking other devices but less time transmitting actual user information.

Thus, there exists a need in the art for a method and system for providing Scan state operations for devices without limiting the connection of the devices.

SUMMARY

In an exemplary embodiment of the present invention, a network communication device comprises a first interface for exchanging information with a network device, a second interface connected to the first interface for establishing a connection with the network device, and middleware logic for coordinating information exchange between the first interface and the second interface. The second interface comprises a clock and a clock value. The clock value may be dynamically altered. The network communication device may be a Bluetooth device or a Bluetooth Access Point and is capable of functioning in a scan state and a connect state simultaneously.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written disclosure focus on disclosing example embodiments of this invention, it should be clearly understood that the same is by way of illustration and example only and the invention is not limited thereto. The spirit and scope of the present invention are limited only by the terms of the appended claims.

DETAILED DESCRIPTION OF THE DRAWINGS

Before beginning a detailed description of the invention, it should be noted that, when appropriate, like reference numerals and characters may be used to designate identical, corresponding or similar components in differing figure drawings. Further, in the detailed description to follow, example embodiments and values may be given, although the present invention is not limited thereto. The present invention solves the above mentioned problems by providing a network element, such as a Bluetooth Access Point device, that may contain multiple radio interfaces such that Scan operations may be performed simultaneously while the device remains in a connected state.

In an illustrative embodiment of the present invention, a Bluetooth Access Point contains multiple physical radio interfaces and interfaces Bluetooth devices to a network backbone. For example, the device may contain two radio interfaces with one radio being in a scan state and one being in a connected state. Middleware logic coordinates the information exchanged by the two radio interfaces and provides a means for communication between the two interfaces. The middleware logic may also screen information and may monitor and control the information that may be passed to Bluetooth devices desiring a connection. The device may achieve nearly 100 percent traffic utilization and still accept new connections. Further, the scan state is continuous resulting in the desired condition of the device being able to become aware of surrounding devices thus improving responsiveness.

Bluetooth devices may establish connections through exchange of information obtained during scan states. In one embodiment, a Bluetooth device may send its clock value and Bluetooth Device Address (BD_ADDR) during the connection establishment phase to a second Bluetooth device with which it desires to establish a connection. The second Bluetooth device may then establish a time-reference to the native clock value received from the first Bluetooth Device. Since exchange of native clock values is necessary for proper time-synchronicity and time-synchronicity is necessary to establish a Bluetooth connection, one device may calculate an offset value between its clock value and the clock value of the corresponding device to establish a Bluetooth connection. The Bluetooth device adds the offset value to its own free running native clock to approximate the clock of the second Bluetooth device's clock and time synchronization is achieved. The Bluetooth device that initiates the connection is the Master and is the device with which time-synchronization is referenced.

In addition, connection between Bluetooth devices depends on a shared knowledge of a pre-determined Frequency Hopping Pattern (FHP) which informs each device of which Frequency Channel (FC) it should tune its radio to during which time slot. The specific FHP to be used for data transfer during the Connected state is the Channel Hopping Pattern (CHP) and the Bluetooth devices exchange information during the connection set-up phase so that the CHP may be determined.

The CHP is determined during the scan states of the Bluetooth devices. Since typical Bluetooth devices cannot be in the scan state and connected state simultaneously, a typical Bluetooth device would have to leave the connected state to enter the scan state in order to receive information necessary to determine the common CHP necessary to communicate or establish a connection with another Bluetooth device. In an illustrative embodiment of the present invention, a device is provided that is able to continue in the connected state and scan state simultaneously so that, for example, the CHP may be determined without losing connections with other Bluetooth devices.

Figure 1:
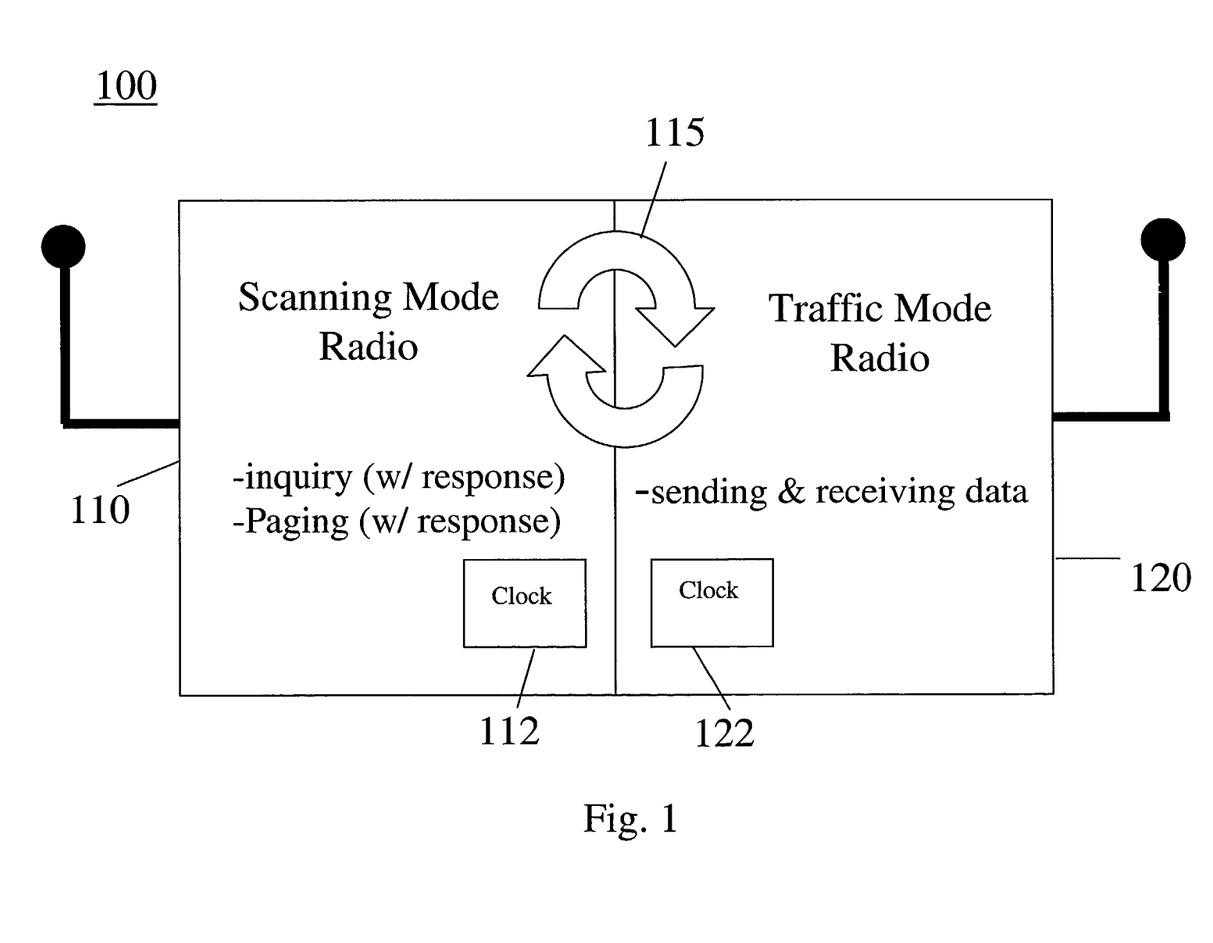
FIG. 1 illustrates an exemplary device in accordance with embodiments of the present invention.

FIG. 1 illustrates an exemplary Bluetooth device 100. The device may be a Bluetooth Access Point (BAP) 100 containing at least two radios. One of the radios may be a scanning mode radio 110 and another radio may be a traffic mode radio 120 as described below. The exemplary device of FIG. 1 illustrates two radios however it should be understood that the invention is not so limited as any number of traffic mode radios 120 may be used.

Each radio may have a clock which may provide clock values used in establishing a connection between Bluetooth devices. The scanning mode radio 110 may have a clock 112 and the traffic mode radio may have a traffic mode radio clock 122. As explained below, the scanning mode radio may transmit a clock value corresponding to the traffic mode radio clock 122.

The scanning mode radio 110 may communicate with the traffic mode radio 120 using middleware logic 115. Middleware logic 115 may be employed as software logic where address information such as the Bluetooth Device Address (BDA) may be accessible. In addition, the middleware logic 115 may have the current value of the traffic mode radio clock 122, which is a dynamic value.

Figure 2:
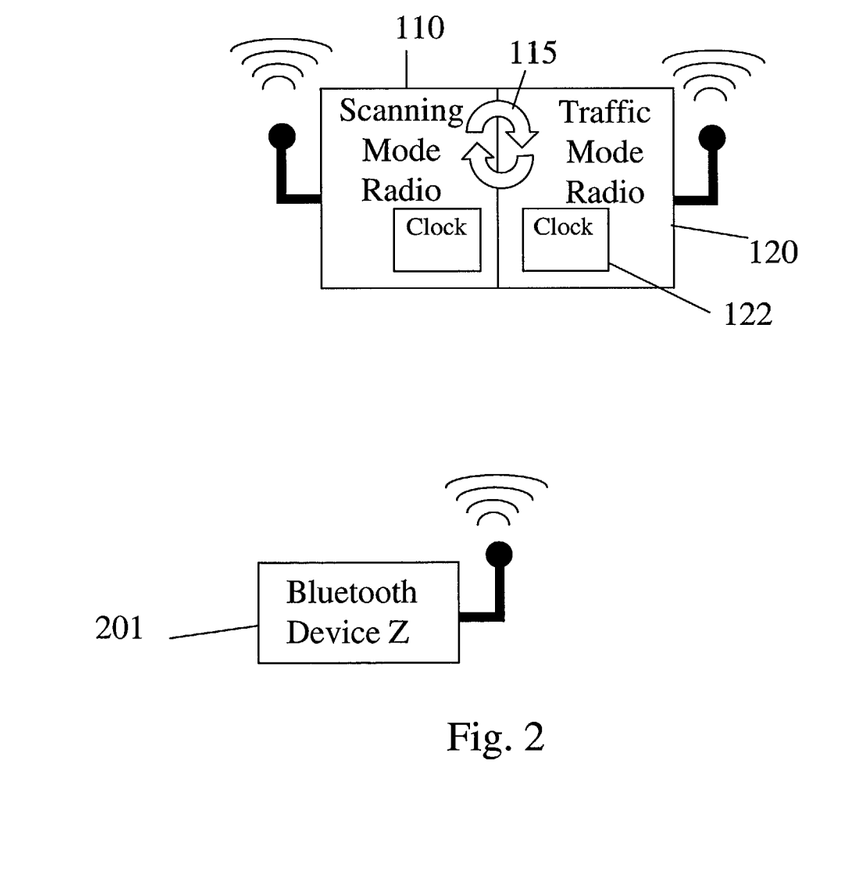
FIG. 2 illustrates an exemplary data flow in accordance with embodiments of the present invention.

FIG. 2 is an exemplary embodiment illustrating the method of establishing data transmission between devices, the originating device (BAP 110) and the receiving device (Bluetooth device Z 201).

Figure 3:
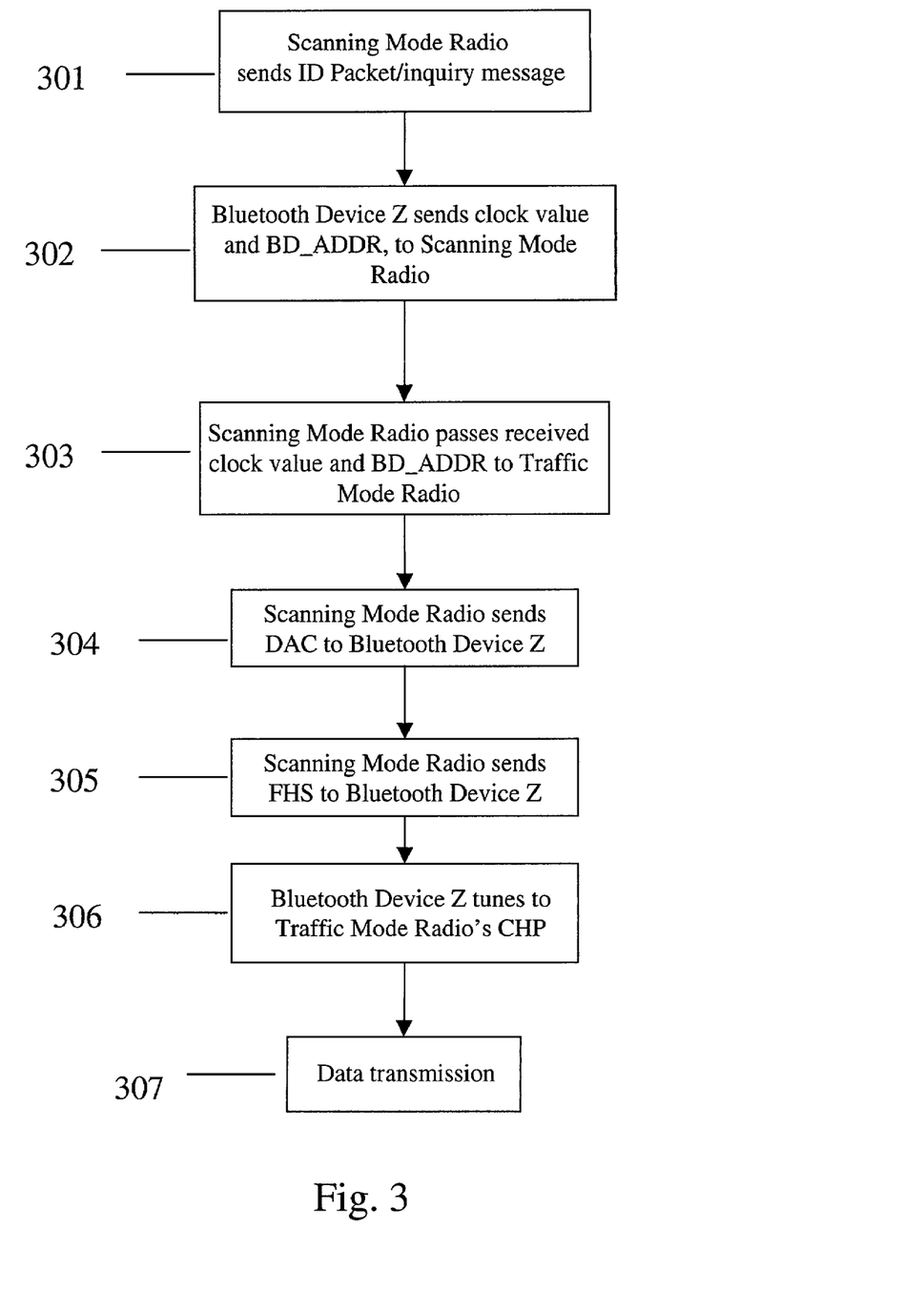
FIG. 3 is a flowchart illustrating an exemplary method of communication in accordance with embodiments of the present invention.

FIG. 3 is a flowchart illustrating steps in the exemplary method. In step 301, the scanning mode radio 110 of the BAP 100 depicted in FIG. 2 may send an ID packet such as an INQUIRY message to a Bluetooth device 201 with which BAP 100 desires a connection. The ID packet (or INQUIRY message) may contain an inquiry access code (IAC), which may apply to all devices or to selected devices sharing a common trait, for example. Bluetooth Device Z 201 may receive the first inquiry message containing a matching Inquiry Access Code (IAC) and may respond with a second message such as an INQUIRY_RESPONSE message which may contain the clock value and an address (i.e., BD_ADDR) of the Bluetooth Device Z 201 thereby providing its clock value and BD_ADDR to the scanning mode radio 110 (step 302). The scanning mode radio 110 may forward the clock value and BD_ADDR received from the Bluetooth Device Z 201 to the traffic mode radio 120 via middleware logic 115 that connects the scanning mode radio 110 and the traffic mode radio 120 (step 303). The scanning mode radio 110 may then send an ID packet containing a Dedicated Access Code (DAC) of a desired Bluetooth Device Z 201 (step 304), the DAC being an access code unique to a particular device. Upon receiving a response ID packet containing the DAC of the desired Bluetooth Device Z 201, the scanning mode radio 110 may send an FHS packet containing the traffic mode radio BD_ADDR and traffic mode radio clock to the Bluetooth Device Z 201 (step 305). Bluetooth Device Z 201 receives the clock value and BD_ADDR of the traffic mode radio 120 of the originating device and may then determine the corresponding CHP for the traffic mode radio 120 of the device. After the CHP is determined, the Bluetooth Device Z 201 may tune to the CHP of the Traffic Mode Radio 120 (step 306). The CHP in turn may determine the frequency of operation and the corresponding times of operation at the respective frequencies. Data transmission may then occur (step 307). In this illustration, the BAP is the originating device and is therefore the master device. Bluetooth device Z 201 is the slave.

Figure 4:
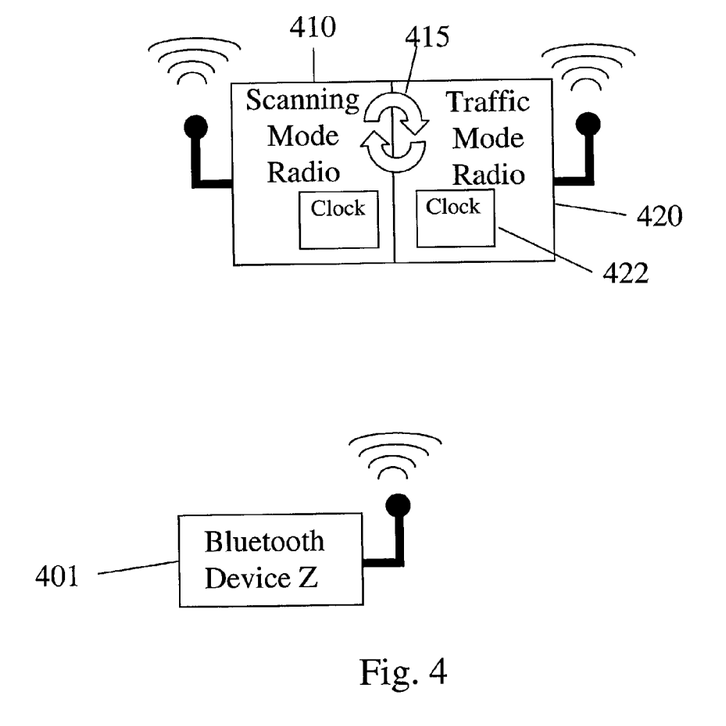
FIG. 4 illustrates an exemplary data flow in accordance with embodiments of the present invention.
Figure 5:
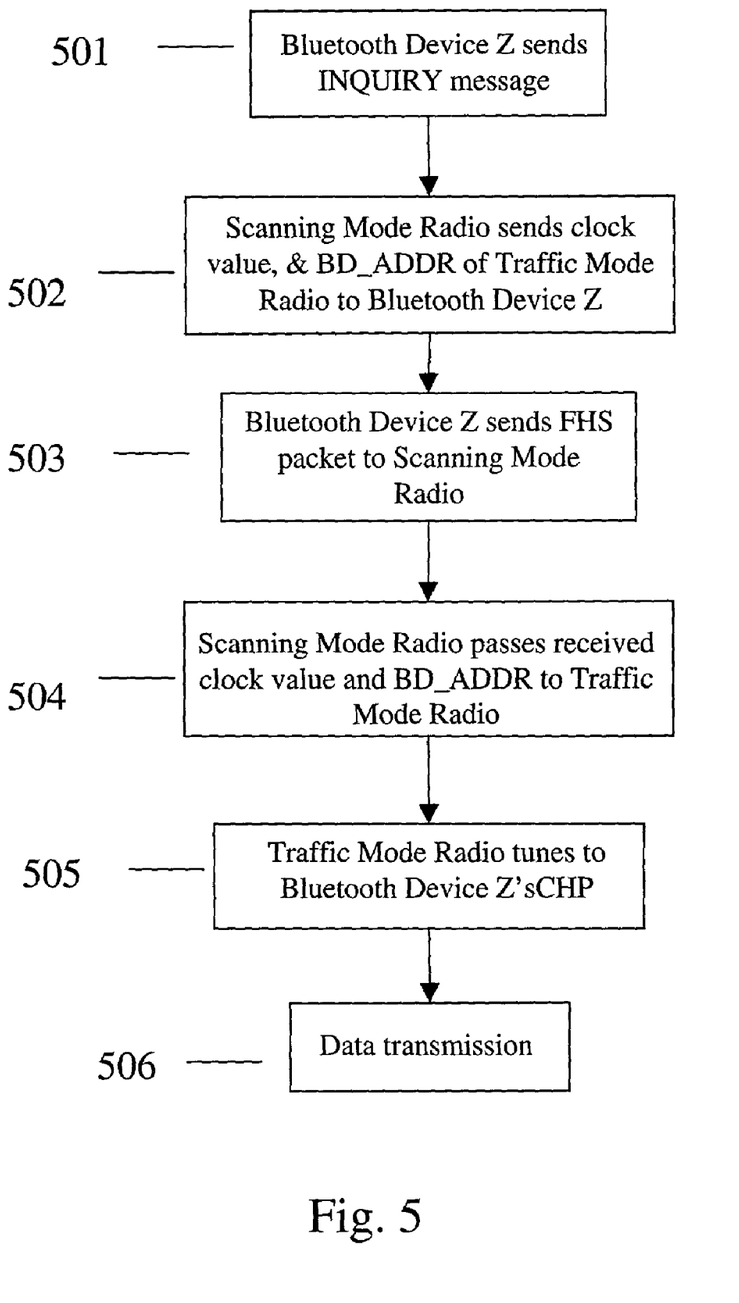
FIG. 5 is a flowchart illustrating an exemplary method of communication in accordance with embodiments of the present invention.

FIGS. 4 and 5 show another exemplary embodiment of the present invention wherein a Bluetooth Device establishes a connection with a Bluetooth Access Point device.

FIG. 5 is a flowchart illustrating steps in another exemplary method. In this example, a Bluetooth device (depicted as Bluetooth device Z 401 in FIG. 4) establishes a connection with a receiving device comprising a scanning mode radio 410 and a traffic mode radio 420. The receiving device may be a Bluetooth Access Point (BAP). The Bluetooth device Z 401 may send an ID packet such as an inquiry message to the BAP, for example (step 501).The ID packet (e.g., inquiry message) may contain an Inquiry Access code (IAC) that may apply to all devices or selected devices sharing a common trait, for example. The scanning mode radio 410 may receive the inquiry message from the Bluetooth Device Z 401 and respond with a response such as an INQUIRY_RESPONSE message (step 502). The response message may include clock values and the address (i.e., BD_ADDR) of the traffic mode radio 420 received through middleware logic 415 such that the scanning mode radio 410 may send the clock value and BD_ADDR of the traffic mode radio 420 to the Bluetooth Device Z 401 (step 502). Bluetooth device Z 401 may receive the information from the scanning mode radio 410 and send a data packet such as a FHS packet, which may contain a clock value and a BD_ADDR of the Bluetooth Device Z 401 (step 503). The scanning mode radio 410 may receive the FHS packet and may pass the clock values and BD_ADDR received from the Bluetooth Device Z 410 to the traffic mode radio 420 through middleware logic 415, for example (step 504). The traffic mode radio 420 may tune to the CHP of the Bluetooth device Z 401 after synchronizing its clock value to that of the Bluetooth device 410 (step 505), the CHP determining the frequency and times of transmission. Data transmission may then occur in either direction (step 506). In this example, the Bluetooth device Z 401 initiated the inquiry and is therefore defined as the master.

Figure 6:
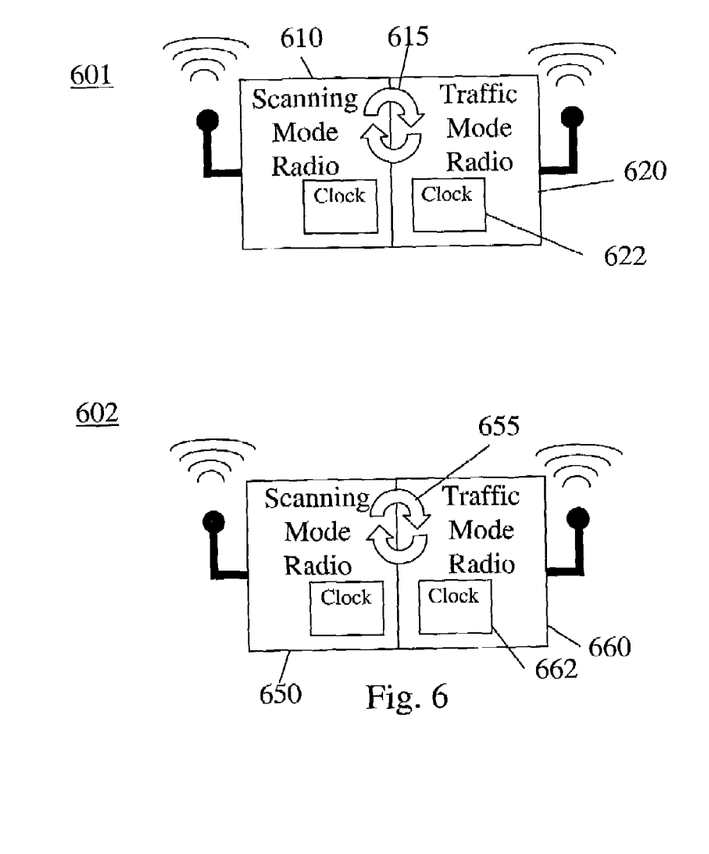
FIG. 6 illustrates an exemplary data flow in accordance with embodiments of the present invention.
Figure 7:
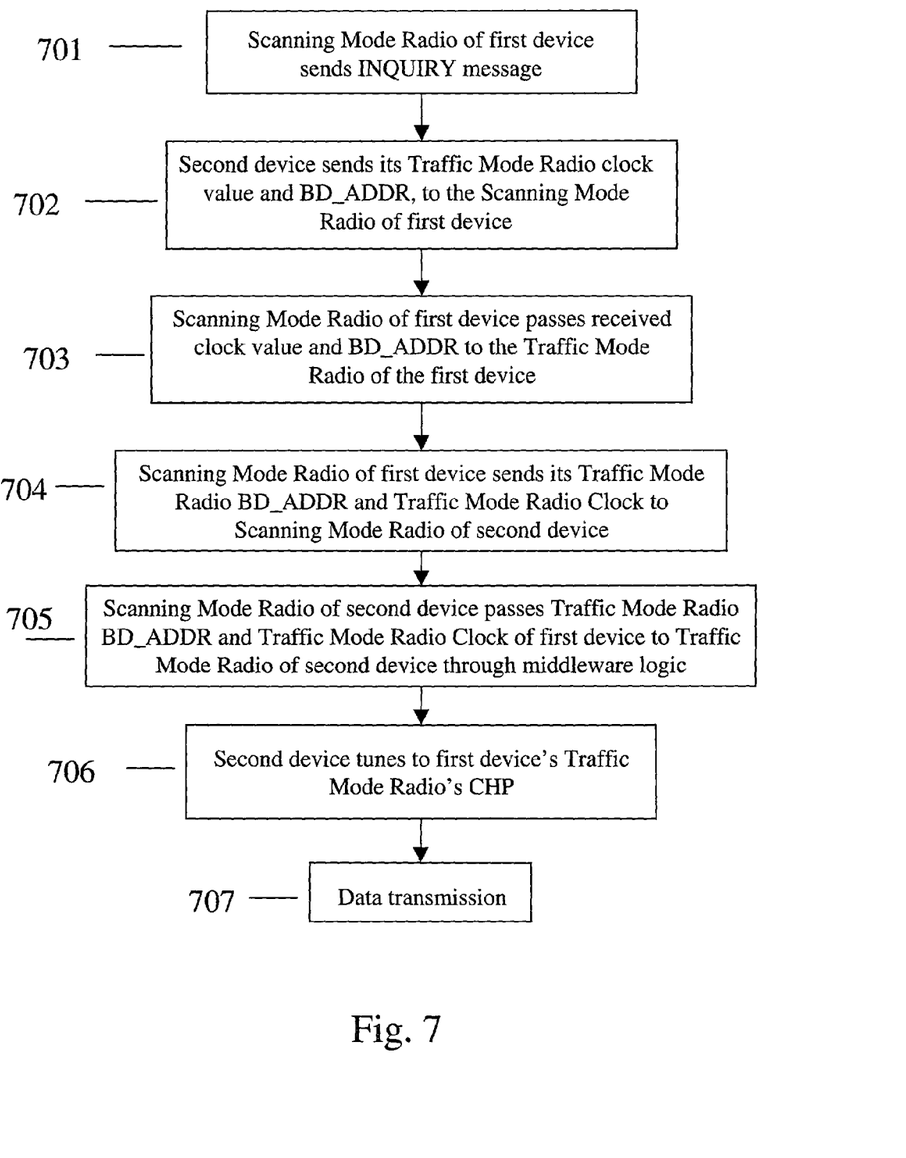
FIG. 7 is a flowchart illustrating an exemplary method of communication in accordance with embodiments of the present invention.

FIGS. 6 and 7 illustrate another exemplary embodiment of the present invention wherein communication is established between two devices, each device containing a scanning mode radio and a traffic mode radio.

FIG. 7 is a flowchart illustrating steps in a method associated with FIG. 6. In this example, an originating (or first) Bluetooth device 601 comprising a scanning mode radio 610 and a traffic mode radio 620 establishes a connection with a receiving (or second) Bluetooth device 602 also comprising a scanning mode radio 650 and a traffic mode radio 660 as depicted in FIG. 6. As illustrated in FIG. 6, the traffic mode radio 620 of the originating (or first) Bluetooth Device 601 may comprise a clock 622 with a corresponding clock value of the Bluetooth Device 601. Likewise, the traffic mode radio 660 of the receiving (or second) Bluetooth Device 602 may comprise a clock 662 with a corresponding clock value of the Bluetooth Device 602. The originating (or first) Bluetooth Device 601 (scanning mode radio 610) may send an inquiry message to the receiving (or second) Bluetooth device 602 (scanning mode radio 650), for example (step 701). The inquiry message may contain an Inquiry Access Code (IAC) that may apply to all devices or a group of devices sharing a common trait, for example. The scanning mode radio 650 of the receiving (or second) Bluetooth device 602 may receive the inquiry message from the originating (or first) Bluetooth Device 601 and respond with a response such as an INQUIRY_RESPONSE message (step 702). This response may be a FHS packet containing the address (i.e., BD_ADDR) and traffic mode clock value of the receiving (or second) device 602 obtained by the scanning mode radio 650 of the second device 602 through middleware logic 655 such that the receiving (or second) device 602 may send its traffic mode radio clock value and BD_ADDR to the scanning mode radio 610 of the first device 601 (step 702). The traffic mode radio clock value of the receiving (or second) device 602 may correspond to the clock 662 of the receiving (or second) device 602. The originating (or first) Bluetooth device 601 may receive the information from the scanning mode radio 650 of the receiving (or second) Bluetooth device 602 and send the received clock value and BD_ADDR to the traffic mode radio 620 of the originating (or first) device 601 (step 703). The originating (or first) Bluetooth device 601 may also send a data packet such as a FHS packet, which may contain a clock value and a BD_ADDR of the traffic mode radio 620 to the scanning mode radio 650 of the receiving (or second) device 602 (step 704). This clock value may correspond to the clock 622 of the originating (or first) Bluetooth device 601. The scanning mode radio 650 of the receiving (or second) Bluetooth device 602 may receive the FHS packet containing the clock value and BD_ADDR of the traffic mode radio 620 of the originating (or first) device and pass these parameters received from the originating (or first) Bluetooth Device 601 to the traffic mode radio 660 of the receiving (or second) Bluetooth device 602 (step 705) through middleware logic 655, for example. The traffic mode radio 660 of the receiving (or second) Bluetooth device 602 may tune to the CHP of the originating (or first) Bluetooth device after synchronizing its clock value to that of the originating Bluetooth device (step 706), the CHP determining the frequency and times of transmission. Data transmission may then occur in either direction (step 707).

It is understood that the present invention can take many forms and embodiments. The embodiments shown herein are intended to illustrate rather than to limit the invention, it being appreciated that variations may be made without departing from the spirit of the scope of the invention.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. A network communication device, comprising:
    a first interface that exchanges information with a network device;
    a second interface connected to the first interface that establishes a connection with the network device; and
    middleware logic that coordinates information exchange between the first interface and the second interface,
    wherein the second interface includes a clock,
    wherein the first interface is configured to transmit a first message to the network device, the first message including an inquiry access code that includes an access code of the network device, and
    wherein the first interface is configured to receive a second message from the network device, the second message including a first clock value and a first address corresponding to the network device.

2. The device of claim 1, wherein the first interface is configured to deliver a second clock value and a second address to the second interface via the middleware logic.

3. The device of claim 1, where in the first interface is configured to transmit a third message to the network device, the third message including a second clock value corresponding to the second interface and a second address corresponding to the second interface.

4. The device of claim 3, wherein the second interface is configured to determine a Channel Hopping Pattern (CHP) of the network device based on the first clock value and the first address corresponding to the network device.

5. A network communication device, comprising:
    a first interface that exchanges information with a network device;
    a second interface connected to the first interface that establishes a connection with the network device; and
    middleware logic that coordinates information exchange between the first interface and the second interface,
    wherein the second interface includes a clock,
    wherein the first interface is configured to receive a first message from a network device, the first message including an inquiry access code that includes an access code of the network device, and
    wherein the first interface is configured to transmit a second message to the network device, the second message including a first clock value corresponding to the clock of the second interface and a first address corresponding to the second interface.

6. The device of claim 5, wherein the first interface is configured to receive a third message from the network device, the third message comprising a second clock value corresponding to the network device and a second address corresponding to the network device.

7. The device of claim 6, wherein the first clock value is modified based on the second clock value.

8. The device of claim 6, wherein the first interface is configured to deliver the second clock value and the second address to the second interface via the middleware logic.

9. The device of claim 8, wherein the second interface is configured to determine a Channel Hopping Pattern (CHP) of the network device based on the second clock value and the second address corresponding to the network device.

10. The device of claim 9, wherein the second interface is configured to tune to the network device based on CHP of the network device.

11. A method of establishing a connection with a network device while in a Scan state and Connect state simultaneously, the method comprising:
    receiving an inquiry message at a first interface from the network device, said inquiry message including an inquiry access code;
    transmitting a response message from the first interface to the network device, said response message including a first clock value and a first address, wherein the first clock value and the first address correspond to a second interface, said second interface being logically connected to the first interface;
    receiving a data packet at the first interface from the network device, said data packet comprising a second clock value corresponding to the network device and a second address corresponding to the network device;
    sending the second clock value and the second address to the second interface whereby a connection is established with the network device via the second interface.

12. The method of claim 11 further comprising:
    adjusting the first clock value based on the second clock value;
    deriving a Channel Hopping Pattern (CHP) of the network device based on the second clock value and the second address; and
    tuning the second interface to the CHP of the network device.

13. The method of claim 11, wherein the network device is a Bluetooth device.

14. A method of establishing a connection with a network device while in a Scan state and Connect state simultaneously, the method comprising:
    receiving an inquiry message at a first interface from a second interface, said inquiry message including an inquiry access code;
    transmitting a response message from the first interface to the second interface, said response message including a first clock value and a first address, wherein the first clock value and the first address correspond to a third interface, said third interface being logically connected to the first interface;
    receiving a data packet at the first interface from the second interface, the data packet comprising a second clock value and a second address, wherein the second clock value and the second address correspond to a fourth interface, said fourth interface being logically connected to the second interface;
    sending the second clock value and the second address to the third interface whereby a connection is established with the fourth interface via the third interface.

15. The method of claim 14 further comprising:
    adjusting the first clock value based on the second clock value; and
    deriving a Channel Hopping Pattern (CHP) of the third interface based on the second clock value and the second address.

16. A method of establishing a connection with a network device while in a Scan state and Connect state simultaneously, the method comprising:
    sending an inquiry message from a first interface to the network device, said inquiry message including an inquiry access code;
    receiving a response message at the first interface from the network device, said response message including a first clock value and a first address, wherein the first clock value and the first address correspond to the network device;

sending the first clock value and first address to a second interface, wherein the second interface is logically connected to the first interface;

sending a data packet to the network device, said data packet comprising a second clock value and a second address, wherein the second clock value and the second address correspond to the second interface and wherein a connection is established with the network device via the second interface.

17. The method of claim 16 further comprising:

deriving a Channel Hopping Pattern (CHP) of the network device based on the second clock value and the second address.

18. The method of claim 16, wherein the network device is a Bluetooth device.

19. A computer readable medium having computer executable instructions for performing a method of establishing a connection with a network device while in a Scan state and Connect state simultaneously, the method comprising:

receiving an inquiry message at a first interface from the network device, said inquiry message including an inquiry access code;

transmitting a response message from the first interface to the network device, said response message including a first clock value and a first address, wherein the first clock value and the first address correspond to a second interface, said second interface being logically connected to the first interface;

receiving a data packet at the first interface from the network device, said data packet comprising a second clock value corresponding to the network device and a second address corresponding to the network device;

sending the second clock value and the second address to the second interface whereby a connection is established with the network device via the second interface.

20. The computer readable medium having computer executable instructions for performing a method of establishing a connection with a network device while in a Scan state and Connect state simultaneously of claim 19, the method further comprising:

adjusting the first clock value based on the second clock value;

deriving a Channel Hopping Pattern (CHP) of the network device based on the second clock value and the second address; and tuning the second interface to the CHP of the network device.

21. The computer readable medium of claim 19, wherein the network device is a Bluetooth device.

22. A computer readable medium having computer-executable instructions for performing a method of establishing a connection with a network device while in a Scan state and Connect state simultaneously, the method comprising:

receiving an inquiry message at a first interface from a second interface, said inquiry message including an inquiry access code;

transmitting a response message from the first interface to the second interface, said response message including a first clock value and a first address, wherein the first clock value and the first address correspond to a third interface, said third interface being logically connected to the first interface;

receiving a data packet at the first interface from the second interface, the data packet comprising a second clock value and a second address, wherein the second clock value and the second address correspond to a fourth interface, said fourth interface being logically connected to the second interface;

sending the second clock value and the second address to the third interface whereby a connection is established with the fourth interface via the third interface.

23. The computer readable medium having computer-executable instructions for performing a method of establishing a connection with a network device while in a Scan state and Connect state simultaneously of claim 22, the method further comprising:

adjusting the first clock value based on the second clock value; and deriving a Channel Hopping Pattern (CHP) of the third interface based on the second clock value and the second address.

24. A computer readable medium having computer-executable instructions for performing a method of establishing a connection with a network device while in a Scan state and Connect state simultaneously, the method comprising:

sending an inquiry message from a first interface to the network device, said inquiry message including an inquiry access code;

receiving a response message at the first interface from the network device, said response message including a first clock value and a first address, wherein the first clock value and the first address correspond to the network device;

sending the first clock value and first address to a second interface, wherein the second interface is logically connected to the first interface;

sending a data packet to the network device, said data packet comprising a second clock value and a second address, wherein the second clock value and the second address correspond to the second interface whereby a connection is established with the network device via the second interface.

25. The computer readable medium having computer-executable instructions for performing a method of establishing a connection with a network device while in a Scan state and Connect state simultaneously of claim 24, the method further comprising:

deriving a Channel Hopping Pattern (CHP) of the network device based on the second clock value and the second address.

26. The computer readable medium of claim 24, wherein the network device is a Bluetooth device.

* * * * *

UNITED STATES PATENT AND TRADEMARK OFFICE
CERTIFICATE OF CORRECTION

PATENT NO. : 7,369,576 B2  
APPLICATION NO. : 10/066781  
DATED : May 6, 2008  
INVENTOR(S) : Famolari Page 1 of 1

It is certified that error appears in the above-identified patent and that said Letters Patent is hereby corrected as shown below:

In the Specification

In Column 4, Line 53, delete "(BAP 110)" and insert -- (BAP 100) --, therefor.

In the Claims

In Column 7, Line 25, in Claim 3, delete "where in" and insert -- wherein --, therefor.

In Column 7, Line 66, in Claim 10, delete "on" and insert -- on the --, therefor.

Signed and Sealed this  
Eleventh Day of November, 2014

Michelle K. Lee  
*Deputy Director of the United States Patent and Trademark Office*